Figure 1:
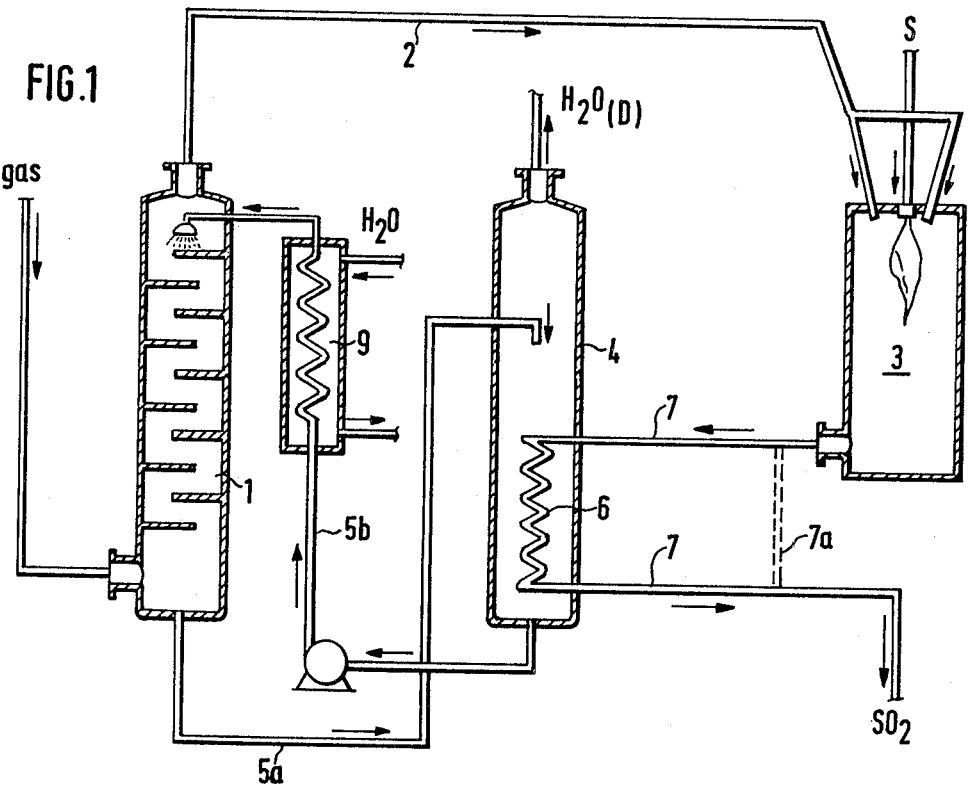

United States Patent [19]

Maier

[11] 4,267,162
[45] May 12, 1981

[54] PROCESS AND APPARATUS FOR THE EXPLOITATION OF THE SULFUR COMPOUNDS CONTAINED IN GASES CONTAINING OXYGEN AND A HIGH WATER VAPOR CONTENT

[75] Inventor: Franz Maier, Markt Schwaben, Fed. Rep. of Germany

[73] Assignee: Süd-Chemie Aktiengesellschaft, Lenbachplatz, Fed. Rep. of Germany

[21] Appl. No.: 36,958

[22] Filed: May 7, 1979

Related U.S. Application Data

[63] Continuation of Ser. No. 646,825, Jan. 6, 1976, abandoned.

[30] Foreign Application Priority Data

Jan. 15, 1975 [DE] Fed. Rep. of Germany ....... 2501419

[51] Int. Cl.³ .................... B01D 19/00; C01B 17/52; C01B 17/54
[52] U.S. Cl. .................... 423/542; 423/543; 423/221; 55/29; 55/32
[58] Field of Search ............... 423/224, 522, 532–538, 423/535–543, 226, 574 R, 575; 55/29, 32

[56] References Cited

U.S. PATENT DOCUMENTS

| 341,316 | 5/1886 | Cochrane | 55/32 |
|---|---|---|---|
| 2,114,787 | 4/1938 | Smith | 55/32 |
| 2,139,375 | 12/1938 | Millar et al. | 423/540 |
| 2,192,126 | 2/1940 | Downs | 55/32 |
| 3,119,663 | 1/1964 | Furkert | 423/535 |
| 3,450,603 | 6/1969 | Meyers et al. | 55/32 |

FOREIGN PATENT DOCUMENTS

| 2333708 | 1/1975 | Fed. Rep. of Germany | 423/226 |
|---|---|---|---|
| 710195 | 1/1971 | South Africa | 423/574 R |

Primary Examiner—Herbert T. Carter
Assistant Examiner—Gary P. Straub
Attorney, Agent, or Firm—Sprung, Felfe, Horn, Lynch & Kramer

[57] ABSTRACT

Sulfur compounds contained in gases containing oxygen and a high content of water vapor are exploited by removing the water vapor content by treating the gases with a glycol and then using the dried gas still containing sulfur compounds, as an oxidation gas for the burning of sulfur or for the roasting of sulfidic ores in the production of highly concentrated sulfuric acid. Apparatus for carrying out the process includes an absorber for absorption by the glycol of the water vapor contained in the gas. The absorber has an exhaust gas conduit connected to a combustion furnace or roasting furnace for the production of sulfur dioxide. A desorber is provided for distilling the water vapor from the glycol and is connected to the absorber by a ring conduit for the glycol enriched with water and for the dewatered glycol. Lastly, apparatus is provided for the heating of the glycol and the desorber.

17 Claims, 2 Drawing Figures

PROCESS AND APPARATUS FOR THE EXPLOITATION OF THE SULFUR COMPOUNDS CONTAINED IN GASES CONTAINING OXYGEN AND A HIGH WATER VAPOR CONTENT

This is a continuation of application Ser. No. 646,825, filed Jan. 6, 1976 now abandoned.

BACKGROUND

A variety of processes are available for the desulfurization of production exhaust gases, but their economic feasibility depends to a great extent on the concentration of the sulfur compounds. For example, the use of Claus apparatus for the production of sulfur from gases containing hydrogen sulfide is limited to a hydrogen sulfide concentration of at least 10% by volume. Furthermore, for reasons connected with the kinetics of the reaction, the gas must not contain any oxygen, and it must contain as little water vapor as possible. Furthermore, the Claus process can be used for the desulfurization of oxygen-free gases only with a certain amount of difficulty if the gases contain, in addition to hydrogen sulfide, organic compounds of sulfur, such as $CS_2$, COS or mercaptans.

Gases which contain these compounds and are additionally characterized by an excess of oxygen and a high moisture content are, for example, the exhaust gases from the production of cellulose sulfate and viscose.

For the purification of the exhaust gases from the production of viscose it is known to adsorb the $CS_2$ content of these gases onto active charcoal and then recover them by desorption. This process, however, is economical as a rule only when the $CS_2$ concentration in the gas amounts to at least 2 $g/m^3$ and the $H_2S$ concentration is on the order of a few parts per million. In the case of $CS_2$ concentrations of more than 2 $g/m^3$ and $H_2S$ concentrations of up to 3 $g/m^3$, it is common to perform a combined recovery of carbon disulfide and elementary sulfur formed by the oxidation of the hydrogen sulfide on the active charcoal in the presence of oxygen. However, if the hydrogen sulfide concentration rises to more than 3 $g/m^3$, the active charcoal is overheated on account of the high heat in the conversion of $H_2S$ to elemental sulfur, and in conjunction with the $CS_2$ there is a danger of fire.

It has therefore been necessary in these cases to remove the hydrogen sulfide by an oxidative preliminary washing with the use of, for example, an arsenite-arsenate washing solution, before passing the gas through the active charcoal to remove the carbon disulfide. This oxidative preliminary washing, however, had a negative effect on the economic feasibility of the exhaust gas desulfurization on account of the high investment cost and on account of the relatively great consumption of chemicals. In addition, waste water problems are created by the elimination of the irreversible by-products of the reaction.

THE INVENTION

The invention is addressed to the problem of treating in a simple and economical manner gases which contain sulfur compounds and which have hitherto been difficult to desulfurize by processes of the prior art on account of their high oxygen and water vapor content, and at the same time to make profitable use of the sulfur content of the gases.

The invention thus concerns a process for the exploitation of the sulfur compounds contained in sulfurous gases of high water vapor content, which is characterized in that the water vapor content is removed by treating the gases with a glycol and using the dried gas, still containing sulfur compounds, as an oxidation gas for the combustion of sulfur or for the roasting of sulfidic ores in the recovery of high concentrated sulfuric acid.

The gases to be purified generally have an oxygen content of about 5 to 21%, preferably of 19 to 21%, by volume. The water vapor content of the gases may be as high as the saturation partial pressure of the water at the temperature used in each case, i.e., it may be as high as 100% relative humidity, but it can even be higher. The bottom limit of the water vapor content corresponds generally to a relative humidity of about 30 to 50%. The gases commonly have temperatures of about 20° to 70° C., preferably of about 30° to 50° C.

The gases used in accordance with the invention can contain as sulfur compounds hydrogen sulfide or hydrogen sulfide mixed with organic sulfur compounds such as $CS_2$, COS and mercaptans. Small amounts of $SO_2$ can also be present.

The hydrogen sulfide content generally amounts to about 1 to 20% by volume, preferably about 1 to 10% by volume. The organic sulfur compounds can be present in amounts of 0 to 1.5 vol.-%, preferably 0.1 to 1 vol.-%.

Gases of this kind are, for example, the exhaust gases from the production of cellulose sulfate or of viscose. For example, an exhaust gas from the production of viscose generally has the following composition:
$H_2S$: 0.01 to 2.0 vol.-%
$CS_2$: 0.06 to 0.9 vol.-%
Balance air, saturated with water vapor at 30° to 50° C.

The use of oxygen-containing gases of high water vapor content as an oxidation gas for the burning of sulfur or for the roasting of sulfide ores in the production of highly concentrated sulfuric acid is not possible without drying, since a high water vapor content not only results in the formation of acid mists but also interferes with the absorption equilibrium. In the case of a preliminary drying of the moist gases involved in accordance with the invention with the concentrated sulfuric acid yielded as the product, the difficulty is created that the concentrated sulfuric acid reacts with the hydrogen sulfide contained in the gas according to the equation:

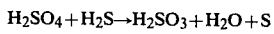

$$H_2SO_4 + H_2S \rightarrow H_2SO_3 + H_2O + S$$

with the separation of sulfur which contaminates the sulfuric acid.

The use of glycols as drying agents in accordance with the invention for the first time provides a practical method.

The following, for example, can be used as glycols: Ethylene glycol, diethylene glycol and/or triethylene glycol. The last is used preferentially.

In a preferred embodiment of the process of the invention, the water is distilled from the water-laden glycol, and the glycol thus regenerated is reused for the drying of the gases.

For the distillation of the water from the glycol, the waste heat from the sulfur oxidation or from the roasting of the sulfidic ores, for example, can be used; this waste heat can be delivered directly to the glycol or by means of a steam circulation system.

Also subject matter of the invention is an apparatus for the performance of the above-described process, which is characterized by the following principal components:

An absorber for the absorption by the glycol of the water vapor contained in the gas, having its gas exhaust connected to a burning or roasting furnace for the production of $SO_2$;

A disorber for distilling the water vapor from the glycol, which is connected to the absorber by a recirculating conduit for the water-laden glycol, and one for the dehydrated glycol; and Apparatus for the heating of the glycol in the desorber.

This last apparatus can be disposed, for example, in the gas exhaust of the combustion furnace or roasting furnace, i.e., the hot gases containing $SO_2$ can be fed directly through the desorber for indirect heat exchange.

The apparatus for heating the glycol in the desorber, however, can also be connected with a steam generator provided in the combustion furnace or roasting furnace, i.e., the hot, sulfur dioxide-containing gases are in an indirect heat exchange with a steam generator, and the fresh, high-pressure steam produced therein is fed to the desorber for indirect heat exchange to distill the water from the glycol.

The invention will be explained below with the aid of the appended drawings.

FIG. 1 is a diagrammatic representation of an embodiment of an apparatus for the performance of the process of the invention. The moist, oxygen-containing gas passes into the bottom of the absorber 1 and there comes into contact with the glycol. The dried gas leaves the absorber through the line 2, which in this embodiment leads to a furnace 3 in which sulfur is burned indicated by the letter S and the flame). The sulfur compounds still contained in the gas are burned in the furnace 3 together with the sulfur, to form sulfur dioxide. Instead of being fed to a sulfur burning furnace, the dried, oxygen-containing gas can also be introduced into a roasting furnace in which sulfur dioxide is produced by the roasting of sulfidic ores. In either case, the hot gas containing sulfur dioxide is used to heat the glycol in a desorber 4. For this purpose the hot gas flows through line 7 through the heating system 6, represented diagrammatically as a heating coil, in the desorber 4, and yields its heat to the glycol by indirect heat exchange. The water that is distilled is drawn off at the top of the desorber 4. In general, only a portion of the hot, sulfur dioxide-laden gases suffices for the regeneration of the water-laden glycol. Another portion of these gases can be removed directly through the conduit 7a, in which a steam generator can be disposed if desired. The cooled, sulfur dioxide-laden gases, which no longer contain any other sulfur compounds, are treated in a conventional manner for the production of $SO_3$ and sulfuric acid.

The regenerated glycol flowing from the desorber 4 is delivered through conduit 5b and, if desired, through a cooler 9 to the top of the absorber 1, and there it is brought in counterflow contact with the entering gas and becomes charged with water. The glycol charged with water flows through conduit 5a back into the desorber 4 where it is regenerated.

Figure 2:
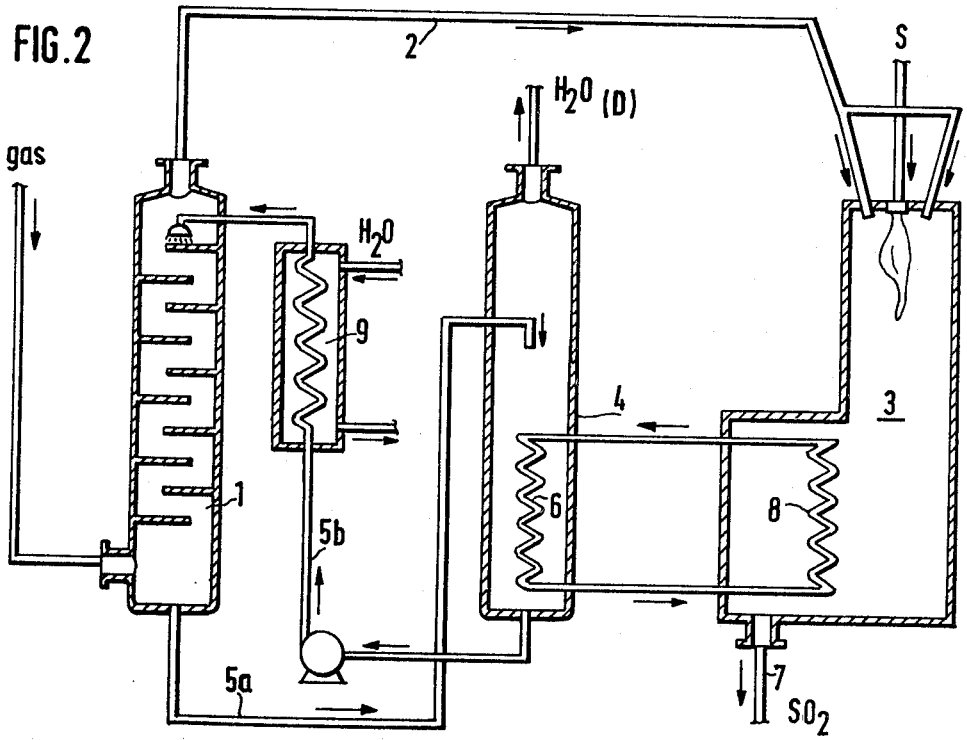

FIG. 2 is a diagrammatic representation of another embodiment of the apparatus for the performance of the process of the invention. The manner of operation of the absorber 1 and of the desorber 4 is the same as in the embodiment represented in FIG. 1. The sulfur combustion furnace 3 is also essentially the same as in FIG. 1, except that the hot sulfur dioxide-laden exhaust gases of the furnace 3 are not carried directly through the desorber 4. Instead, a steam generator 8, indicated diagrammatically by a cooling coil, is disposed in furnace 3. The steam under pressure which is produced here is delivered to apparatus 6 to heat the glycol in desorber 4, and after yielding its heat to the glycol it flows back into the steam generator 8 as condensate.

The embodiment represented in FIG. 2 with the additional steam circuit permits a better control of the glycol regeneration in desorber 4.

EXAMPLE

The oxygen-containing gas is an exhaust gas from the production of viscose and is fed through the absorber 1 at a rate of 20,000 m³/h. The gas has a temperature of 40° C. and is saturated with water vapor. The water burden of the gas thus corresponds to approximately 1100 kg/h. The hydrogen sulfide content of the gas is 1.5% by volume, and the carbon disulfide content is 0.7% by volume, corresponding to a total sulfur content of 0.75 metric tons per hour.

Triethylene glycol is used as the drying agent in absorber 1. The triethylene glycol is charged with water in absorber 1, and the exhaust gas flowing from absorber 1 and carried by conduit 2 to the sulfur combustion furnace 3 has, after drying, a dew point of about 0° C.

The water-laden triethylene glycol is regenerated in desorber 4 by indirect heat exchange with hot steam, leaving the desorber with a temperature of about 190° C.

The hot steam necessary for the heating of the triethylene glycol is, in the embodiment represented in FIG. 2, obtained from the waste heat of the hot, sulfur dioxide-containing gases of the sulfur combustion furnace 3. These gases are cooled by indirect heat exchange in the steam generator from about 1200° C. to about 450° C.

The sulfur dioxide-containing exhaust gas is free of hydrogen sulfide and carbon disulfide. Its sulfur dioxide content, which is derived partially from these compounds and partially from the sulfur that is burned, is adjusted so that this gas can be treated in a conventional manner for the production of sulfur trioxide or concentrated sulfuric acid.

What is claimed is:

1. Process for the exploitation of the sulfur compounds of gases, said sulfur compounds consisting essentially of hydrogen sulfide or hydrogen sulfide mixed with organic sulfur compounds selected from the group consisting of $CS_2$, COS and mercaptans, said gases also containing oxygen in an amount sufficient to oxidize said hydrogen sulfide and water vapor in an amount corresponding to a relative humidity of from 30 to 100 percent, which comprises removing water vapor by treating the gases having temperatures of from 20 to 70° C. at atmospheric pressure with an ethylene glycol, and using the dried gas, still containing said sulfur compounds, as an oxidation gas for the burning of sulfur or for the roasting of sulfidic ores in the production of highly concentrated sulfuric acid.

2. Process of claim 1 wherein triethylene glycol is used as the source of ethylene glycol.

3. Process of claim 1 wherein the water is distilled from the water-laden ethylene glycol and the regenerated ethylene glycol is reused for the drying of the gases.

4. Process of claim 3 wherein the waste heat from the oxidation of sulfur or from the roasting of sulfidic ores is used for the distillation of the water from the ethylene glycol.

5. Process of claim 4 wherein the waste heat from the sulfur oxidation or roasting is used directly or through a steam circuit for the distillation of the water from the ethylene glycol.

6. Process of claim 1 wherein the sulfur-containing gas contains $H_2S$ in a concentration of 1 to 20 volume percent.

7. Process according to claim 6 wherein the $H_2S$ concentration is between 1 and 10 volume percent.

8. A process according to claim 1 wherein the gas containing sulfur compound is gas emitted from a viscose plant and contains $H_2S$ in an amount of 0.01 to 2 volume percent.

9. A process according to claim 8 wherein said gas contains $CS_2$ in an amount of 0.06 to 0.09 volume percent.

10. A process according to claim 1 wherein the sulfur containing gas contains an organic sulfur compound in an amount up to 1.5 weight percent.

11. A process according to claim 10 wherein said organic sulfur compound is present in an amount of 0.1 to 1.0 volume percent.

12. A process according to claim 1, wherein the oxygen content of the gas is 5 to 21% by volume.

13. A process according to claim 12, wherein the organic sulfur compound content of the gas is up to 1.5 volume percent.

14. A process for the drying of gases containing sulfur compounds, said sulfur compounds consisting essentially of hydrogen or hydrogen sulfide mixed with organic sulfur compounds selected from the group consisting of $CS_2$, COS and mercaptans, said gases also containing oxygen in an amount sufficient to oxidize said hydrogen sulfide and water vapor in an amount corresponding to the relative humidity of from 30 to 100%, which comprises removing water vapor by treating the gases having temperatures of from 20° to 70° C. at atmospheric pressure with an ethylene glycol and recovering the dried gas still containing said sulfur compounds.

15. A process according to claim 14, wherein the hydrogen sulfide content of the gas is 1 to 20 vol. %.

16. A process according to claim 15, wherein the oxygen content of the gas is at least 5% by volume.

17. A process according to claim 16, wherein the oxygen content of the gas is 5 to 21% by volume.

* * * * *